United States Patent [19]
Rudolph

[11] 3,835,717
[45] Sept. 17, 1974

[54] GEARLESS INTERMITTENT MOTION DEVICE

[76] Inventor: Rome R. Rudolph, 4113 Lee Rd., Gibsonia, Pa. 15044

[22] Filed: Apr. 5, 1973

[21] Appl. No.: 347,991

[52] U.S. Cl. .......................................... 74/70, 74/63
[51] Int. Cl. ............................................. F16h 21/48
[58] Field of Search ................................... 74/70, 63

[56] References Cited
UNITED STATES PATENTS

| | | | |
|---|---|---|---|
| 686,366 | 11/1901 | Thode | 74/70 |
| 1,571,653 | 2/1926 | Textorius | 74/70 |
| 2,660,065 | 11/1953 | Williams | 74/70 |
| 3,033,052 | 5/1962 | Mouchon | 74/63 |

Primary Examiner—Samuel Scott
Assistant Examiner—Wesley S. Ratliff, Jr.
Attorney, Agent, or Firm—Brown, Murray, Flick & Peckham

[57] ABSTRACT

A gearless device for producing intermittent output from a single continuous input. The device incorporates a conjugate pair of endless internal cam surfaces secured to the input shaft which rotates at a constant angular velocity. Cam followers, supported by the output shaft, engage the cam surfaces and are angularly displaced thereby to produce, at the output shaft, a motion period followed by a dwell period. The conjugate pair of cam surfaces and the cam followers may be arranged to provide output oscillation or output indexing.

8 Claims, 31 Drawing Figures

GEARLESS INTERMITTENT MOTION DEVICE

BACKGROUND OF THE INVENTION

1. Field of the Invention

The invention relates to an intermittent motion device, and more particularly to a gearless intermittent motion device incorporating a conjugate pair of endless internal cam surfaces and cam followers which may be arranged to provide output oscillation or output indexing from a single continuous input.

2. Description of the Prior Art

Numerous oscillator and indexing mechanisms are known in the art. For a rather extensive compilation of such mechanisms see John H. Bickford, *Mechanisms for Intermittent Motion*, New York: Industrial Press, Inc., 1972. To the best of applicant's knowledge, there are no known gearless oscillating or indexing mechanisms which incorporate a conjugate pair of endless internal cam surfaces and cooperating cam followers.

SUMMARY OF THE INVENTION

The principal object of this invention is to provide a compact intermittent motion device having a gearless drive train connecting the input shaft to the output shaft in torque transmitting relation.

Another object of this invention is to provide a gearless intermittent motion device for producing intermittent output from a single continuous input—the output being oscillation or indexing.

Still another object of this invention is to provide a novel gearless drive train capable of producing intermittent oscillation of the output shaft through oscillation angles greater than those of prior art oscillators.

A still further object of this invention is to provide a novel gearless drive train capable of producing intermittent indexing of the output shaft.

A further object of this invention is to provide a novel gearless drive train incorporating conjugate internal cams and cooperating cam followers which may be arranged to produce a variety of dwell-motion ratios for either oscillating output or indexing output.

Another object of this invention is to provide a novel gearless drive train incorporating conjugate internal cams and cooperating cam followers which may be arranged to produce the output motions of a variety of formulized motion equations which are well known in the art.

The present invention provides a compact device having an input shaft and an output shaft at opposite ends thereof. A gearless drive train connects the input and output shafts in torque transmitting relation.

In accordance with the present invention, the drive train comprises the basic combination of (1) a conjugate pair of endless internal cam surfaces, and (2) at least one cam follower for each of the cam surfaces. The conjugate pair of endless internal cam surfaces is connected to the input shaft for rotation thereby about the first or drive axis thereof. The cam followers are supported by the output shaft such that at least one cam follower is engaged with each cam surface during each complete rotation of the cam surfaces about the first axis. The cam followers also are supported by the output shaft for free rotation about follower axes spaced from the second axis.

The basic combination of cam surfaces and two cam followers can be employed to provide an oscillator mechanism wherein during successive motion periods, the output shaft is oscillated through a selected oscillation angle, first in one direction and then in the opposite direction. A family of cam surfaces may be developed for each specified oscillation angle to provide the requisite timing, i.e., dwell-motion ratio.

The basic combination of cam surfaces and at least four cam followers also may be employed to provide an indexing mechanism wherein during each motion period, the output shaft is rotated in the same direction as the input shaft, through a selected indexing angle. A family of cam surfaces can be developed for each specified indexing angle to provide the requisite timing, i.e., dwell-motion ratio.

DESCRIPTION OF THE PREFERRED EMBODIMENTS

Figures 1, 2, 3A, 3B, 4:
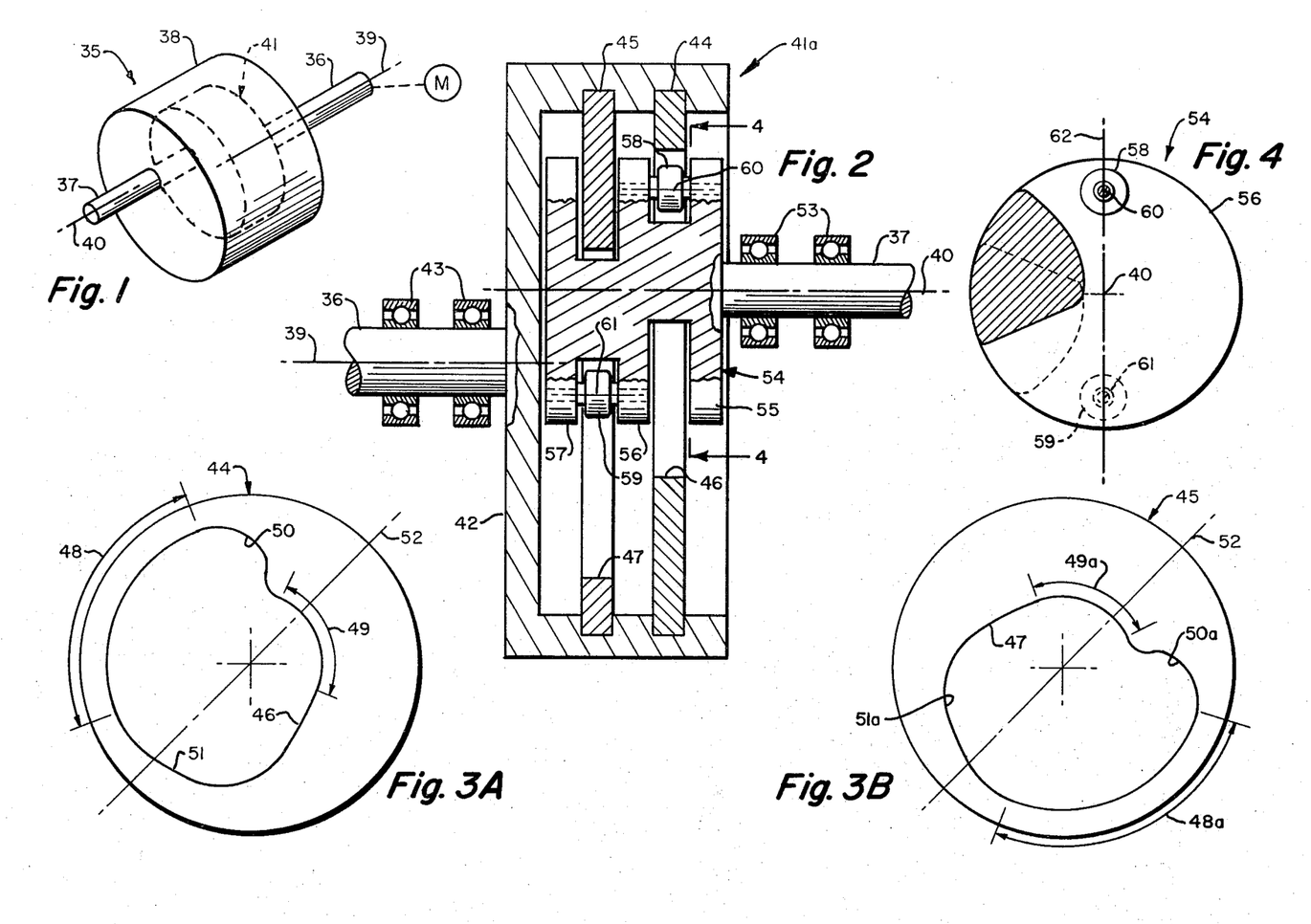
FIG. 1 is an isometric view schematically illustrating the gearless intermittent motion device of this invention.
FIG. 2 is a cross-sectional view, illustrating an embodiment of the present device which operates as an oscillator.
FIGS. 3A and 3B are elevation views illustrating a conjugate pair of cam members employed in the device of FIG. 2.
FIG. 4 is a cross-sectional view taken along the line 4—4 of FIG. 2.

FIG. 1 illustrates a compact, gearless intermittent motion device 35 having input and output shafts 36, 37 extending from the opposite ends of a housing 38. The shafts 36, 37 are parallel and are rotatable, respectively, about a first or drive axis 39 and a second or output axis 40. The shafts 36, 37 are connected in torque transmitting relation by a gearless drive train 41.

The gearless drive train of this invention, may be of the type producing oscillation of the output shaft 37 during successive motion periods. That particular type of the present drive train provides an oscillator mechanism, embodiments of which will be described with reference to FIGS. 2 through 19 inclusive.

The gearless drive train of this invention, may be of the type producing indexing of the output shaft during each motion period. That particular type of drive train provides an indexing mechanism, embodiments of which will be described with reference to FIGS. 20 through 32 inclusive.

OSCILLATOR MECHANISM: FIG. 2 illustrates a gearless drive train 41a comprising a drive member 42 secured to and rotatable by the input shaft 36 about the first axis 39. The input shaft 36 may be rotatably supported by journal means 43 carried by the housing 38. Secured to the drive member 42 is a conjugate pair of cams 44, 45 presenting endless internal cam surfaces 46, 47 having, in this embodiment, the perimeter profiles illustrated in FIGS. 3A, 3B.

The cam surface 46 (FIG. 3A) includes a constant large radius segment 48 and a constant small radius segment 49—the segments 48, 49 being separated by varying radius segments 50, 51. Similarly, the cam surface 47 (FIG. 3B) includes a constant large radius segment 48a and a constant small radius segment 49a — the segments 48a, 49a being separated by varying radius segments 50a, 51a. It will be observed in FIGS. 3A, 3B that the cam surfaces 46, 47 having identical profiles but that they are mirror images of each other about the axis 52. The cam members 44, 45 are supported by the drive member 42 in the mirror image relationship illustrated in FIGS. 3A, 3B.

Referring to FIG. 2, the output shaft 37 may be rotatably supported by journal means 53 carried by the housing 38. A carrier member 54 is secured to one end of the output shaft 37 and presents spaced-apart connected flanges 55, 56, 57. Cam followers 58, 59 are disposed, respectively, between the flanges 55, 56 and 56, 57 and supported thereby for free rotation about follower axes 60, 61 spaced from the second axis 40. In the oscillator embodiment of the present gearless drive train 41a, the cam followers 58, 59 remain in contact with the cam surfaces 46, 47 throughout each complete revolution of the drive member 42. As best shown in FIG. 4, the cam followers 58, 59 are disposed on opposite sides of the second axis 40. The follower axes 60, 61 and the second axis 40 may reside in a common plane represented by the dash-dot line 62.

The gearless drive train 41a may be incorporated into the device 35 (FIG. 1) to produce an oscillator mechanism 63, the operation of which is schematically illustrated in FIGS. 5-10 inclusive. In the following discussion, the arrow 64 indicates successive positions of the cam members during rotation thereof, whereas the arrow 65 indicates the angular displacement of the output shaft 37. The cam surfaces 46, 47 and the cam followers 58, 59 are identified. The cam members will be assumed to rotate counterclockwise.

In the device 63, the cam surfaces 46, 47 are configured and cooperate with the cam followers 58, 59 so as to provide the following timing (dwell-motion ratio) and operating sequence.

A. The output shaft 37 oscillates (rotates) counterclockwise from the initial postion (0°) through 90° to a second position (+90°) during the first 90° of cam rotation — compare FIGS. 5 to 7;

B. The output shaft 37 dwells in the second position (+90°) during the next 90° of cam rotation — compare FIGS. 7 and 8;

C. The output shaft 37 oscillates (rotates) clockwise from the second position (+90°) through 90° to the initial position (0°) during the next 90° of cam rotation — compare FIGS. 8 to 10; and D. The output shaft 37 dwells in the first position (0°) during the next 90° of cam rotation — compare FIGS. 10 and 5.

Alternative embodiments of the oscillator mechanism, designated generally by the numerals 66, 67, are illustrated in FIGS. 11-13 and 14-16, respectively. Corresponding numerals will be employed to identify corresponding parts neretofore described.

Figure 5:
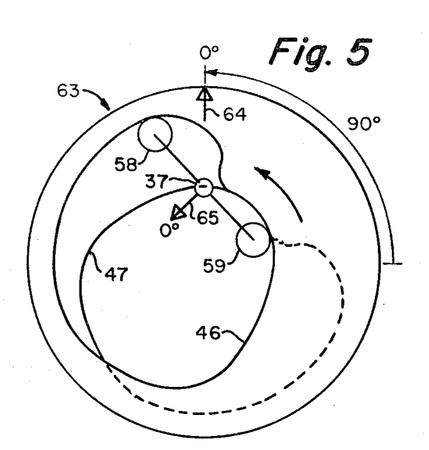
FIGS. 5 through 10 are front views schematically illustrating the operation of the oscillator of FIG. 2.
Figure 6:
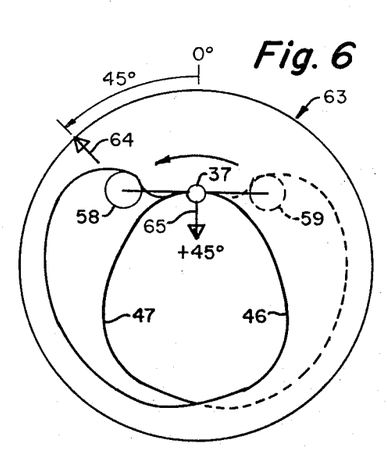
Figure 7:
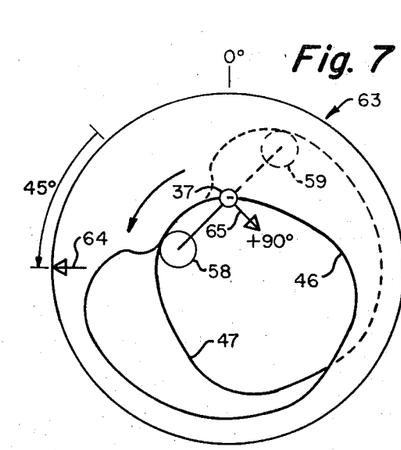
Figure 8:
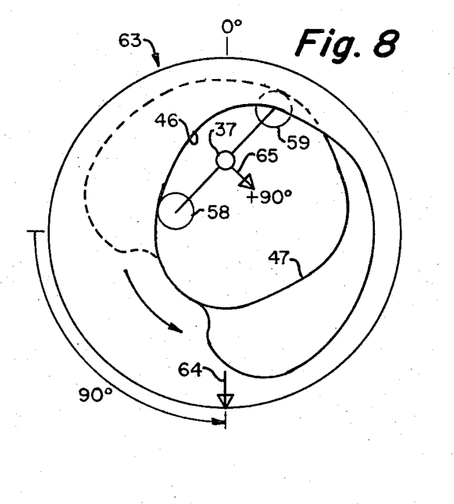
Figure 9:
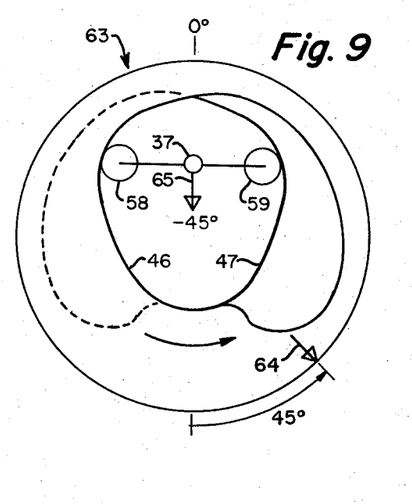
Figure 10:
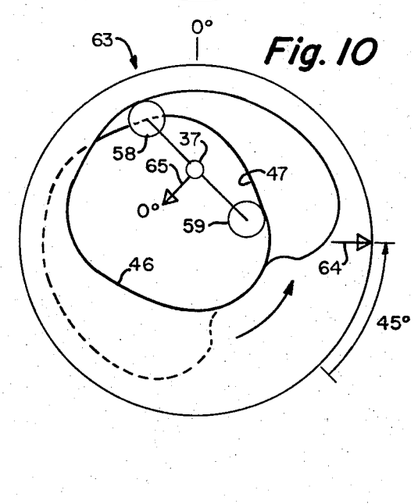
Figure 11:
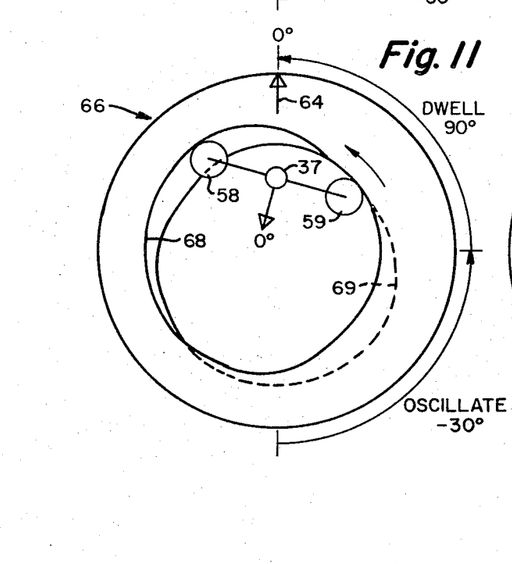
FIGS. 11 through 13 are front views schematically illustrating the operation of an alternative oscillator embodiment of this invention.
Figure 12:
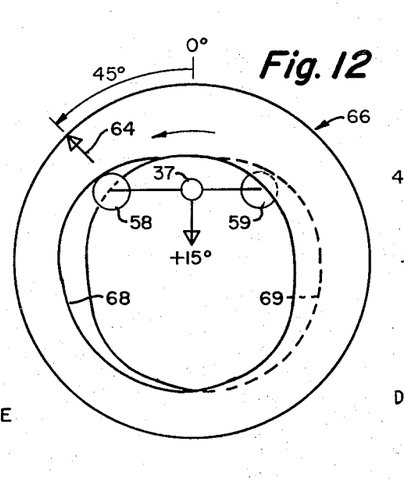
Figure 13:
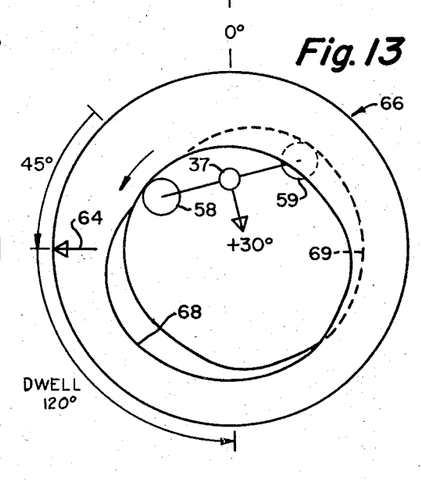

The oscillator mechanism 66 (FIG. 11) incorporates cam members presenting cam surfaces 68, 69 of different perimeter profile, compare FIGS. 5 and 11, for example. The cam surfaces 68, 69 are configured and cooperate with the cam followers 58, 59 so as to provide the following timing (dwell-motion ratio) and operating sequence.

A. The output shaft 37 rotates counterclockwise from the initial position (0°) through 30° to a second position (+30°) during the first 90° of cam rotation — compare FIGS. 11 to 13;

B. The output shaft 37 dwells in the displaced position (+30°) during the next 90° of cam rotation — see FIG. 13;

C. The output shaft 37 rotates clockwise through 30° to the original position (0°) during the next 90° of cam rotation — see FIG. 11; and D. The output shaft 37 dwells in the original position (0°) during the next 90° of cam rotation — see FIG. 11.

Figure 14:
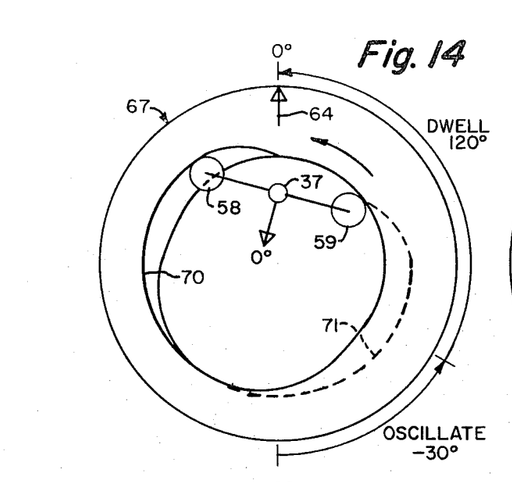
FIGS. 14 through 16 are front views schematically illustrating the operation of a further alternative oscillator embodiment of this invention.
Figure 15:
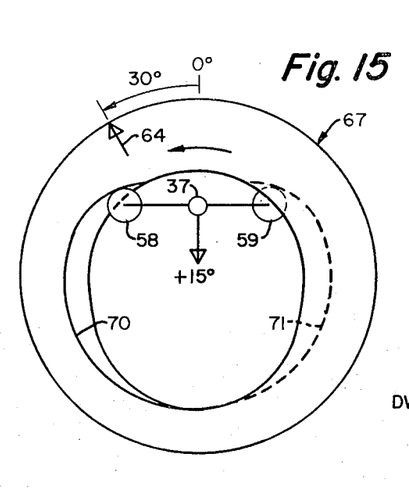
Figure 16:
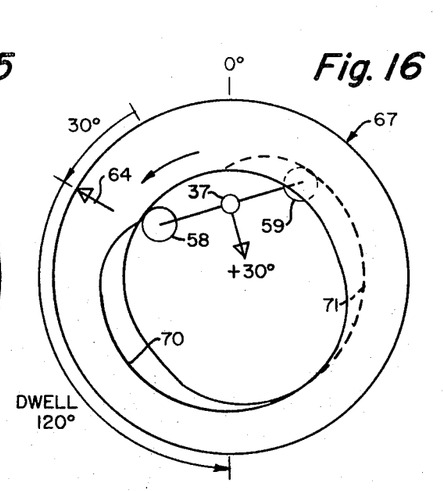

The oscillator mechanism 67 (FIGS. 14-16) incorporates cam members presenting cam surfaces 70, 71 of still different perimeter profiles, compare FIGS. 5, 11 and 14, for example. The cam surfaces are configured and cooperate with the cam followers 58, 59 so as to provide the following timing (dwell-motion ratio) and operating sequence.

A. The output shaft 37 rotates counterclockwise from the initial position (0°) through 30° to a second position (+30°) during the first 60° of cam rotation — compare FIGS. 14 to 16;

B. The output shaft 37 dwells during the next 120° of cam rotation — see FIG. 16;

C. The output shaft 37 rotates clockwise from the second position (+30°) through 30° to the original position (0°) during the next 60° of cam rotation — see FIG. 14; and D. The output shaft 37 dwells during the next 120° of cam rotation — see FIG. 14.

The operation of the oscillator mechanisms 63, 66 and 67 can be summarized as follows:

| EMBODI-MENT (FIGS.) | STROKE (Degrees) | TIMING (Degrees) | | | |
|---|---|---|---|---|---|
| | | Forward | | Return | |
| | | Index | Dwell | Index | Dwell |
| 5-10 | 90 | 90 | 90 | 90 | 90 |
| 11-13 | 30 | 90 | 90 | 90 | 90 |
| 14-16 | 30 | 60 | 120 | 60 | 120 |

It will be appreciated that the oscillator mechanisms 63, 66 and 67 may incorporate only three of a large family of endless internal cam surfaces. Hence, strokes of less than 30 are possible. Strokes of greater than 90 are equally feasible. Moreover, practically any desired dwell-motion ratio can be provided.

Figures 17, 18A, 18B, 19:
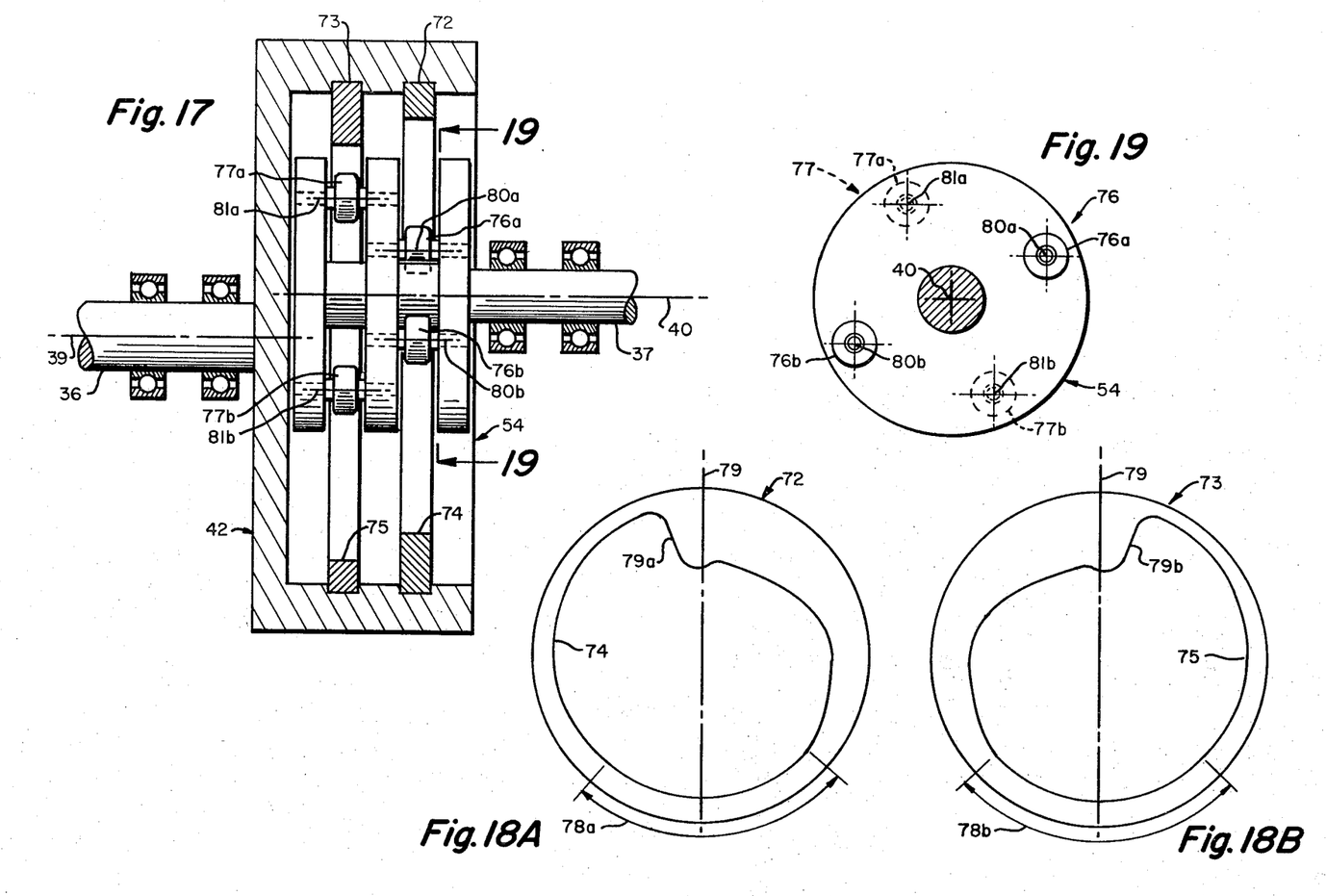
FIG. 17 is a cross-sectional view, similar to FIG. 2, illustrating an embodiment of the present device which operates as an indexing mechanism.
FIGS. 18A and 18B are elevation views illustrating a conjugate pair of cam members employed in the indexing mechanism of FIG. 17.
FIG. 19 is a cross-sectional view taken along the line 19—19 of FIG. 17.

INDEXING MECHANISM: FIG. 17 illustrates a gearless drive train 41b which differs from the drive train 41a (FIG. 2) only in two respects. Namely, by incorporating cam members 72, 73 presenting endless internal cam surfaces 74, 75 having, in this embodiment, the perimeter profiles illustrated in FIGS. 18A, 18B; and by incorporating at least two diametric pairs of cam followers 76, 77, wherein the cam followers 76a, 76b, 77a, 77b are equiangularly (FIG. 19) arranged about the second axis 40.

Referring to FIGS. 18A, 18B, the cam surfaces 74, 75 present one constant radius segment 78a, 78b, respectively — the remaining cam surface including an abutment 79a, 79b respectively. The abutment 79a, 79b is separated from the constant radius segment 78a, 78b by varying radius segments. It will be observed that the cam surfaces 74, 75 have identical profiles but that they are mirror images of each other about the axis 79. The cam surfaces 74, 75 are supported by the drive member 72 (FIG. 17) in the mirror image relationship illustrated in FIGS. 18A, 18B.

It will be observed in FIG. 19 that the cam followers 76a, 76b, 77a, 77b are supported for free rotation about follower axes 80a, 80b, 81a, 81b respectively. The drive train 41b arrangement is such that the cam followers 76a, 76b of one diametric pair 76 are alternately engaged with the cam surface 74, and the cam followers 77a, 77b of the other diametric pair 77 are alternately engaged with the other cam surface 75 during each revolution of the input shaft 36.

The gearless drive train 41b may be incorporated into the device 35 (FIG. 1) to produce an indexing mechanism 81, the operation of which is illustrated in FIGS. 20-25. In the following discussion, the arrow 64 indicates successive positions of the cam members during rotation thereof, whereas the black arrowhead on the cam follower 76a indicates the angular displacement of the output shaft 37. The cam members will be assumed to rotate counterclockwise.

The cam surfaces 74, 75 are configured and cooperate with the cam followers 76a, 76b, 77a, 77b so as to provide a dwell-motion ratio of 0.6, i.e., 135°/225°. The output shaft 37 is rotated through 180° during the 225° motion period and dwells during the 135° dwell period. The indexing mechanism 81 is a two-stop-225° unit, i.e., two revolutions of the cam surfaces 74, 75 produce one complete revolution of the output shaft 37.

Figure 22:
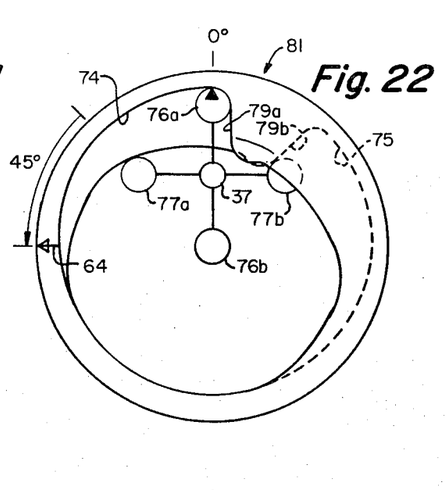
Figure 23:
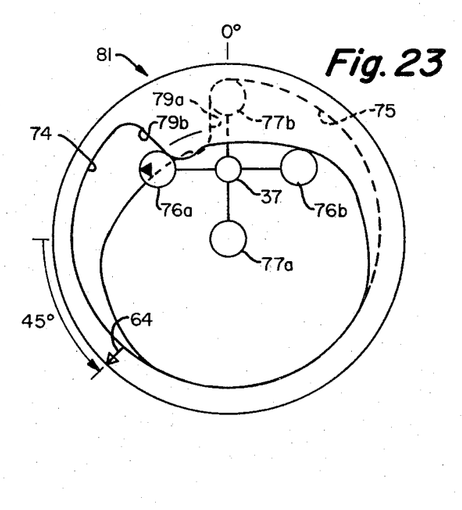
Figure 24:
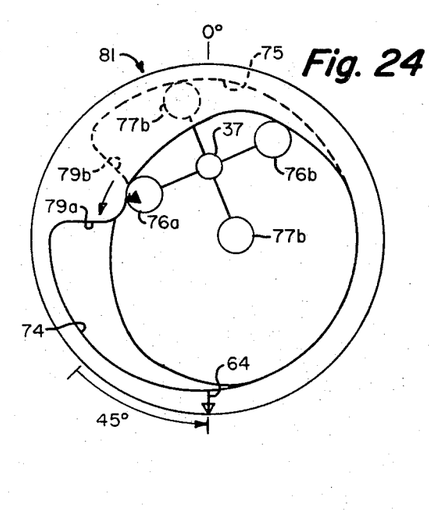

The operation of the indexing mechanism 81 during one revolution of the cam members will now be described. It will be observed in FIGS. 20-22, that during counterclockwise cam rotation of 90°, the output shaft 37 rotates counterclockwise through 45°. In FIG. 22, the cam followers 76a, 77b are now engaged with the abutments 79a, 79b, respectively. During the next 45° of cam rotation, the output shaft 37 rotates 90° — compare FIGS. 22, 23. During the next 45° of cam rotation, the output shaft 37 is rotated 22½° — compare FIGS. 23, 24. During the next 45° of cam rotation, the output shaft 37 is rotated 22½° — compare FIGS. 24, 25. During the next 135° of cam rotation (dwell period), the output shaft 37 remains stationary, see FIG. 25.

Figure 20:
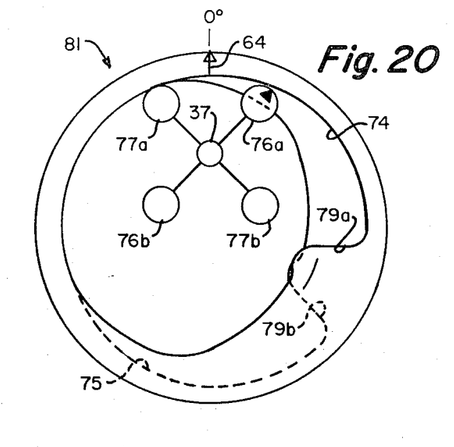
FIGS. 20 through 25 are front views schematically illustrating the operation of the indexing mechanism of FIG. 17.
Figure 21:
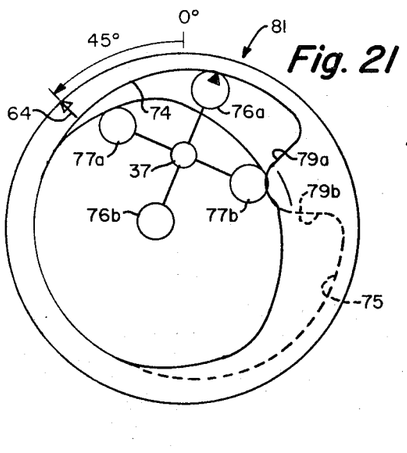
Figure 25:
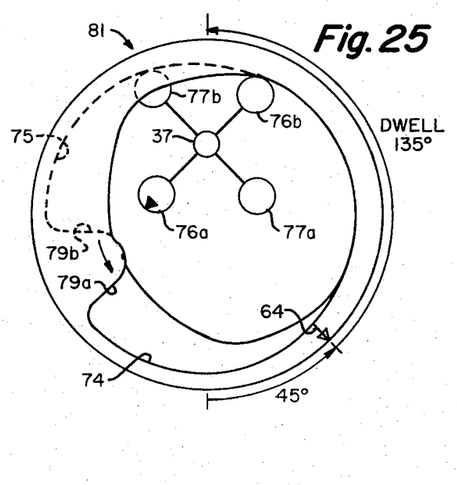

A comparison of FIGS. 20 and 25 will reveal that during 225° of cam rotation, the output shaft 37 is rotated 180°. During the first 90° of cam rotation, the output shaft 37 is accelerated, reaching a maximum acceleration mid-way through the next 45° of cam rotation (FIG. 22). During the last 45° of cam rotation (FIG. 23), the output shaft 37 is decelerated.

An alternative embodiment of the present indexing mechanism, generally designated by the numeral 82, is schematically illustrated in FIGS. 26-29. Corresponding numerals will be employed to identify corresponding parts heretofore described.

Figure 26:
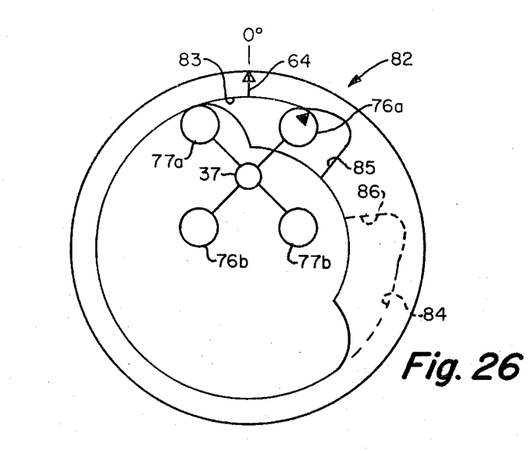
FIGS. 26 through 29 are front views schematically illustrating the operation of an alternative indexing mechanism embodiment.

The indexing mechanism 82 (FIG. 26) incorporates cam members presenting cam surfaces 83, 84 whose perimeter profiles differ from those of the cam surfaces 74, 75 — compare FIGS. 20 and 26, for example. The cam surfaces 83, 84 include abutments 85, 86, respectively. The cam surfaces 83, 84 also include the constant radius segments of the cam surfaces 74, 75. The cam surfaces 83, 84 are configured and cooperate with the cam followers 76a, 76b, 77a, 77b so as to provide a dwell-motion ratio of 2, i.e., 240°/120°. The output shaft 37 is rotated 180° during the 120° motion period, and dwell during the 240° dwell period. The indexing mechanism 82 is a two-stop-120° unit, i.e., two revolutions of the cam surfaces 83, 84 produce one complete revolution of the output shaft 37.

Figure 27:
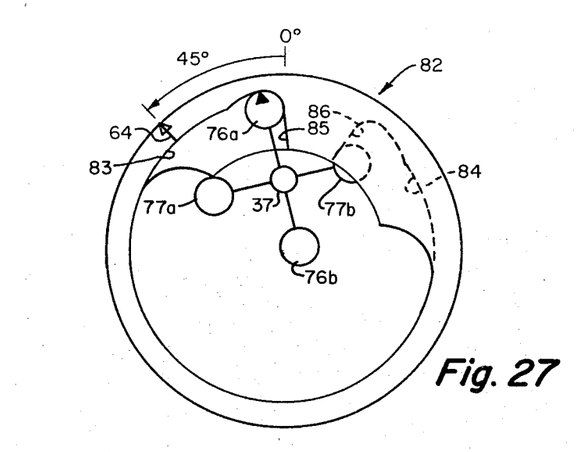
Figure 28:
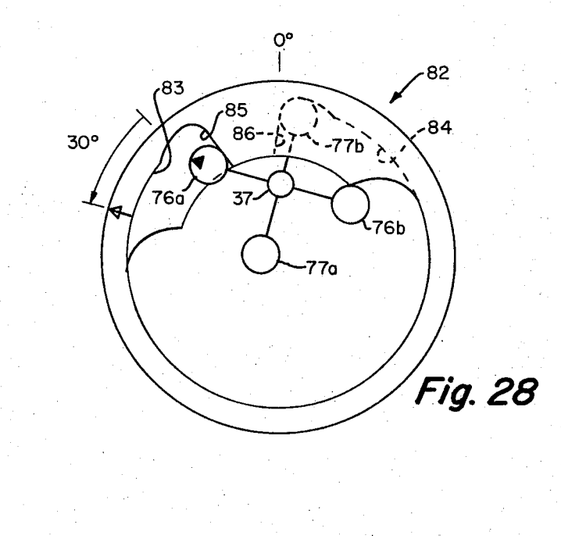

The operation of the indexing mechanism 82 during one complete revolution of the cam surfaces 83, 84 will now be described. During counterclockwise cam rotation of 45°, the output shaft 37 rotates counterclockwise through 60° — compare FIGS. 26, 27. In FIG. 27, the cam followers 76a, 77b are now engaged with the abutments 85, 86, respectively. During the next 30° of cam rotation, the output shaft 37 is rotated 60° — compare FIGS. 27, 28. During the next 45° of cam rotation, the output shaft 37 is rotated another 60° — compare 28, 29. Then, during the next 240° of cam rotation, the output shaft 37 remains stationary (dwells) — see FIG. 29.

Figure 29:
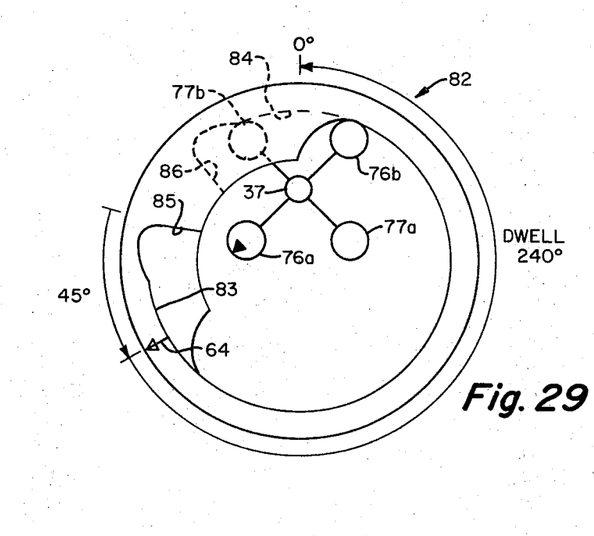

A comparison of FIGS. 26 and 29 will reveal that during 120° of cam rotation, the output shaft is rotated 180°. The output shaft 37 reaches maximum acceleration mid-way through the second 45° of cam rotation (FIG. 28) and is accelerated and decelerated during the first (FIG. 27) and the third (FIG. 29) 45° of cam rotation.

It will be appreciated that the indexing mechanisms 81, 82 provide controlled acceleration and deceleration of the output shaft 37 thereby avoiding undesirable abrupt motion changes. Moreover, the cam surfaces 74, 75 and 83, 84 may be arranged to produce the output motions of a variety of formulized motion equations.

I claim as my invention:

1. A gearless intermittent motion device comprising:

an input shaft supported for rotation about a first axis;

an output shaft supported for rotation about a second axis parallel with said first axis;

a drive member secured to and rotatable by said input shaft, said drive member presenting a conjugate pair of endless internal cam surfaces rotatable with said drive member, said cam surfaces surrounding said first and second axes; and cam followers, at least one for each of said endless internal cam surfaces of said conjugate pair, said cam followers being supported by said output shaft (a) engaged with said cam surfaces, (b) for rotation about follower axes spaced from said second axis, and (c) for arcuate movement about said second axis;

said cam followers are at all times engaged with said cam surfaces and follow the contour thereof, whereby during each revolution of said cam surfaces about said first axis, said output shaft (d) rotates in one direction through a first oscillation angle, (e) remains stationary during a first said dwell period, (f) rotates in the opposite direction through a second oscillation angle identical with said first oscillation angle, and (g) remains stationary during a second said dwell period;

said cam surfaces being configured and cooperating with said cam followers to impart rotary motion followed by a dwell period to said output shaft as said input shaft is rotated continuously.

2. The device of claim 1 wherein said follower axes reside on opposite sides of said second axis and are coplanar therewith.

3. The device of claim 1 wherein each of said cam surfaces presents a constant large radius segment and a constant small radius segment separated from said constant large radius segment by varying radius segments, the extent of the constant radius segments determining the duration of said dwell period.

4. The device of claim 3 wherein said varying radius segments produce an output motion of a selected formulized motion curve.

5. A gearless intermittent motion device comprising:

an input shaft supported for rotation about a first axis;

an output shaft supported for rotation about a second axis parallel with said first axis; the rotation of said output shaft being in the same direction as the rotation of said input shaft;

a drive member secured to and rotatable by said input shaft, said drive member presenting a conjugate pair of endless internal cam surfaces rotatable with said drive member, said cam surfaces surrounding said first and second axes and being spaced axially along said first and second axes; and at least first and second diametric pairs of cam followers, one diametric pair for each of said endless internal cam surfaces, said cam followers being equiangularly spaced about said second axis and supported by an output shaft (a) for revolution therewith about said second axis, (b) for rotation about separate follower axes spaced from said second axis, and (c) with the cam followers of said first diametric pair alternately engaged with one of said cam surfaces of said conjugate pair, and with the cam followers of said second diametric pair alternately engaged with the other of said cam surfaces of said conjugate pair, during each revolution of said input shaft;

said cam surfaces being configured and cooperating with said cam followers of said first and second diametric pairs (d) to rotate said output shaft through a first indexing angle during a motion period wherein said cam surfaces rotate through a first arc segment of revolution, and (e) to maintain said output shaft stationary during a dwell period wherein said cam surface rotate through a second arc segment of revolution.

6. The device of claim 5 wherein the sum of said first arc segment of revolution and said second arc segment of revolution equals one complete revolution of said input shaft.

7. The device of claim 5 wherein each of said cam surfaces presents a constant radius segment and a varying radius segment, the extent of said constant radius segment determining the duration of said dwell period.

8. The device of claim 7 wherein said varying radius segment produces an output motion of a selected formulized motion equation.

* * * * *